Patented July 14, 1953

2,645,664

UNITED STATES PATENT OFFICE 2,645,664

RECOVERY OF SELENIUM

David James Hadley, Epsom Downs, and Robert Heap, Cheam, England, assignors to The Distillers Company Limited, Edinburgh, Scotland, a British company No Drawing. Application July 11, 1949, Serial No. 104,148. In Great Britain August 18, 1948

2 Claims. (Cl. 260—604)

The present invention relates to a step in the process of oxidising olefines by means of molecular oxygen-containing gases in which the oxidation is carried out in the presence of elementary selenium, and refers, in particular, to the recovery of the selenium which has been vaporised and carried away by hot reactants.

In our copending U. S. applications Serial Nos. 790,443 filed December 8th, 1947, now abandoned, 32,546 filed June 11th, 1948, now abandoned, and 44,800 filed August 17, 1948, there have been described processes for the oxidation of olefines, in particular propylene and isobutene, wherein the oxidation is carried out over contact material comprising copper and/or copper oxide and/or copper compounds such as copper aluminate copper silicate and wherein elementary selenium is present in the reaction zone when the reactant gases are conducted over the solid contact material. A particularly useful modification of the process consists in admixing elementary selenium vapours with the olefine and molecular oxygen-containing gases by conducting said reactant gases over a heated mass of elementary selenium whereby a certain amount of selenium vapour is carried away on to the copper-containing contact material. The selenium, after having passed the reaction zone, is then either partly or completely condensed in the cooler parts of the reaction system. On examination of the condensed deposit it has been found that it consists only in part of elementary selenium whilst a considerable part consists of selenium oxide.

It is an object of the present invention to recover elementary selenium from said selenium oxide-containing deposit. It is a further object to prepare the deposit so that it can be used again for the production of selenium vapour during the oxidation of said olefines without appreciable losses due to the oxidation which has been taking place.

Accordingly, in the process of oxidising olefines with free oxygen-containing gases by passing the mixture in the presence in the reaction zone of elementary selenium over a copper-containing contact material to produce thereby unsaturated aldehydes the invention comprises the step of recovering elementary selenium from the deposit containing selenium and selenium oxide, by subjecting said deposit to a heat treatment at temperatures exceeding 240° C. preferably at temperatures between 240° and 400° C. By copper-containing contact material is meant a contact material which contains metallic copper and/or copper oxide and/or copper compounds such as copper silicate and copper aluminate. By this means the selenium oxide is reduced to elementary selenium, the reduction being apparently due to some organic substances which have been retained by the deposit. Since the mass on heating evolves gases such as carbon dioxide and carbon monoxide, the heating may be carried out in the presence of a restricted amount of gases such as air, which is driven out by said evolution of gases or, preferably, in the presence of inert gases such as nitrogen. We have found that the heating is conveniently carried out in a vessel which may be open but which allows only a limited amount of air to have access to the interior thereof, such as, for instance, a flask or the like, so that the amount of gases or vapours liberated during the heating is capable of substantially removing any oxidising gases from the heated zone. The heating may be carried out beyond 400° C. but at these high temperatures the vapour tension of the selenium itself becomes so great that appreciable amounts of the selenium might be vaporized and, thus, lost. Therefore, heating beyond 400° C. would not serve any useful purpose.

The heating according to the present invention has the further practical advantage that the deposit which has been very voluminous and, therefore, difficult to handle in a system for the large-scale oxidation process, becomes more compact and, in consequence, is easier to manipulate.

The following example illustrates the manner in which the invention may be carried out in practice:

Example

A sample of the deposit from the exit of the reactor contained 72.8% total selenium, 14% being present as selenium oxide and the remainder, 58.8%, as elementary selenium or compounds of selenium other than the oxides.

9.73 grams of this deposit were placed in a glass bulb connected with a gas collector. The bulb was heated gradually. Most of the gas evolution occurred at approximately 240° C. Gas was further liberated until the temperature reached about 440° C.

The gas given off contained about 75% $CO_2$ and 16% CO.

The residue weighed 7.36 grams, 96% of which consisted of elementary selenium which completely vaporised on being heated to about 320 to 330° C. in a gas current.

We claim:

1. In the process of oxidising olefines with free oxygen-containing gases by passing the mixture in the presence in the reaction zone of elementary selenium over a copper containing contact material to produce thereby unsaturated aldehydes and cooling the gaseous mixture issuing from said reaction zone, whereby a deposit consisting essentially of selenium and selenium oxide is formed, the step of recovering elementary selenium from the said deposit containing selenium and selenium oxide which consists of subjecting said deposit to a heat treatment at temperatures exceeding 240° C. in an inert atmosphere.

2. Process according to claim 1, wherein the temperature is between 240 and 400° C.

DAVID JAMES HADLEY.
ROBERT HEAP.

References Cited in the file of this patent

UNITED STATES PATENTS

| Number | Name | Date |
| --- | --- | --- |
| 1,999,576 | Riley | Apr. 30, 1935 |
| 2,161,066 | LaLande, Jr. | June 6, 1939 |
| 2,378,824 | Betterton et al. | June 19, 1945 |
| 2,413,374 | Phillips et al. | Dec. 31, 1946 |

OTHER REFERENCES

Mellor, "Treatise on Inorganic and Theoretical Chemistry," vol. 10 (1930), pages 810 and 811, Longmans, Green and Co.